Jan. 2, 1940.  R. L. PENN ET AL  2,185,647
METHOD AND MEANS FOR CUTTING AND JOINING SHEET MATERIAL
Filed Aug. 28, 1937  2 Sheets-Sheet 1
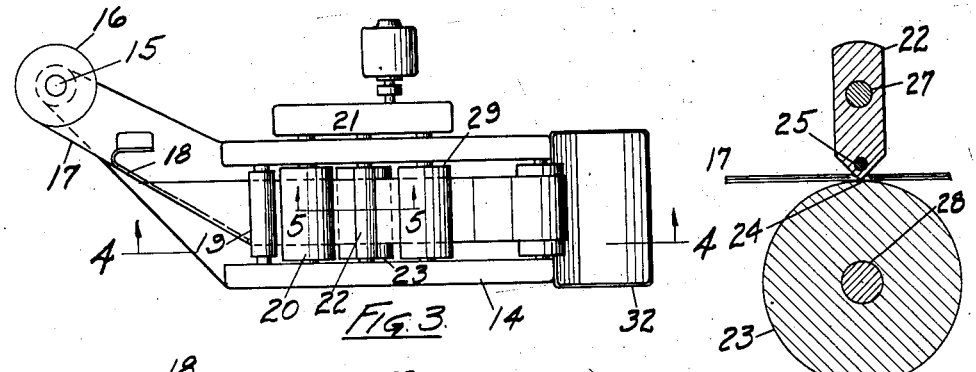
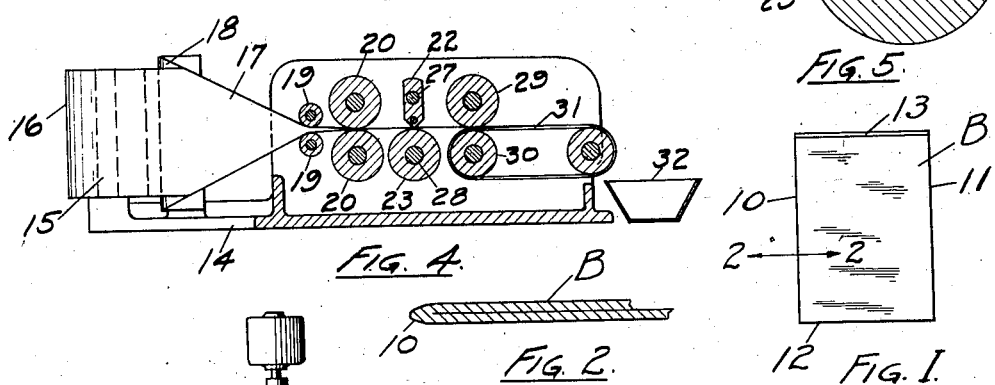
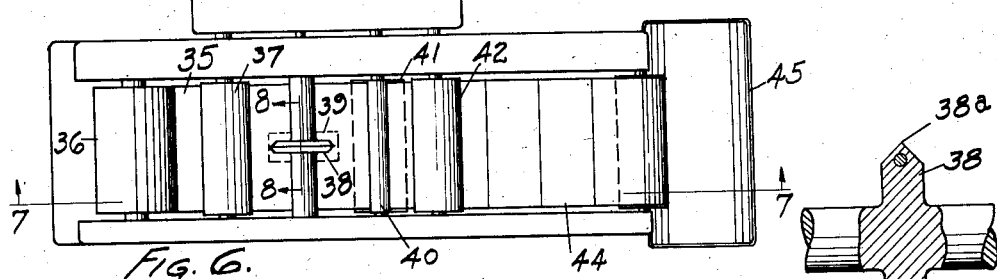
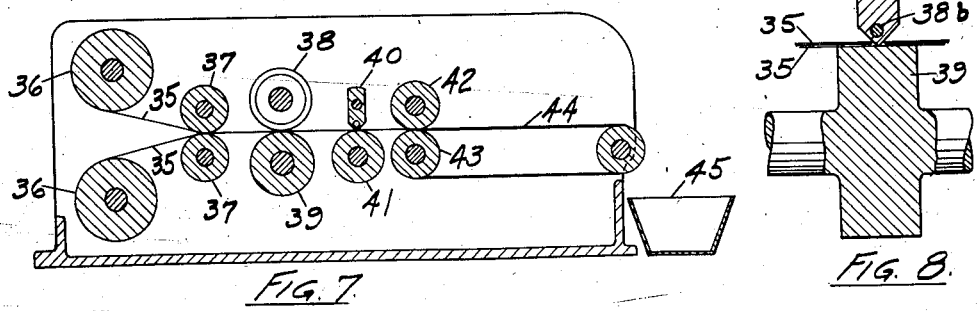
INVENTORS
Norman H. Nye
Ralph L. Penn
Ralph W. Penn Jan. 2, 1940.  R. L. PENN ET AL  2,185,647
METHOD AND MEANS FOR CUTTING AND JOINING SHEET MATERIAL
Filed Aug. 28, 1937  2 Sheets-Sheet 2
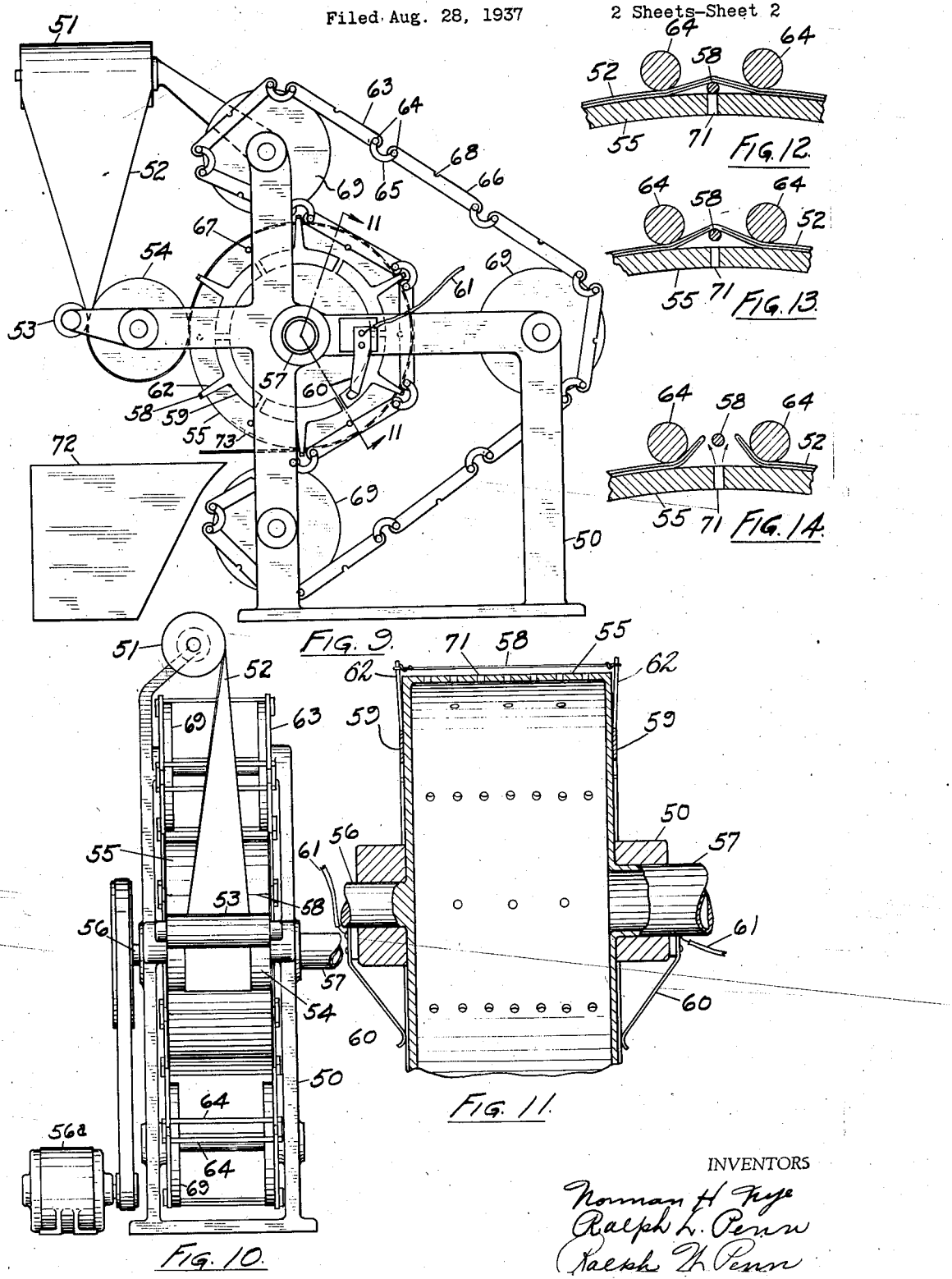
INVENTORS
Norman H. Nye
Ralph L. Penn
Ralph H. Penn Patented Jan. 2, 1940

2,185,647

UNITED STATES PATENT OFFICE 2,185,647

METHOD AND MEANS FOR CUTTING AND JOINING SHEET MATERIAL

Ralph L. Penn, Cuyahoga Falls, Ralph W. Penn, Akron, and Norman H. Nye, Cuyahoga Falls, Ohio, assignors of one-fourth to Edwin J. McIlvried, Stow, Ohio Application August 28, 1937, Serial No. 161,446

17 Claims. (Cl. 93—8)

This invention relates to the manufacture of articles from sheet material, and as its principal object aims to provide a novel method and apparatus for rapidly and economically fabricating envelopes or bags and other articles from sheet material by folding and cutting the material and joining or sealing together the cut edges thereof.

Another object of our invention is to provide a novel method and means for rapidly and economically severing superimposed sheets or strips of material and joining or sealing the adjacent edges to thereby form envelopes, bags, or other useful articles.

The method and apparatus of our invention are especially suitable for the fabrication of articles from sheet material of the kind which is capable of being temporarily rendered soft and fusible or tacky by the application of heat, such as rubber, Celluloid, and other material, and which is herein referred to as a thermoplastic sheet material.

Various different articles can be manufactured from sheet material of this kind by the method and apparatus of our invention, but, for purposes of illustration, the invention is hereinafter disclosed as applied to the production of envelopes or bags adapted to be used as containers for food products or as sanitary containers.

In the accompanying drawings,

Fig. 1 is a plan view of an envelope or bag produced according to our invention;

Fig. 2 is a sectional view on an enlarged scale taken through an edge of the envelope, as indicated by the line 2—2 of Fig. 1;

Fig. 3 is a plan view of one machine adapted to produce the envelope of Fig. 1;

Fig. 4 is a sectional elevation of the machine taken on line 4—4 of Fig. 3;

Fig. 5 is a partial sectional view taken on line 5—5 of Fig. 3 and showing the cutting and joining elements of the machine on a larger scale;

Fig. 6 is a plan view of another machine adapted to produce envelopes according to our invention;

Fig. 7 is a sectional elevation of the machine taken on the line 7—7 of Fig. 6;

Fig. 8 is a partial sectional view taken on line 8—8 of Fig. 7 and showing cutting and joining elements of the machine;

Fig. 9 is a side elevation of another machine for producing envelopes or bags and other articles according to our invention;

Fig. 10 is an end view of the machine;

Fig. 11 is a partial transverse sectional view taken through the drum with the chain removed, as indicated by line 11—11 of Fig. 9; and Figs. 12, 13, and 14 are partial sectional views, of larger scale, taken through the drum, the views being similar to each other but showing the progressive cutting and sealing of the sheet material.

The envelope or bag B, which is shown in Fig. 1 as representing one article adapted to be produced by the novel method and apparatus of our invention, consists of two layers or sheets of material in substantially flat face-to-face relation. The sheets are joined together along their three sides or edges 10, 11, and 12 to form a pocket between the sheets but are unconnected along the fourth side or edge 13 to provide an opening into the pocket. The material used for the envelope may be any suitable sheet material which will be temporarily rendered soft and more or less tacky when heated, that is to say, a suitable thermoplastic sheet material. One such material, which we have found very satisfactory for making strong transparent waterproof bags or envelopes according to our invention, is a commercially available thin transparent sheet rubber.

The novel cutting and joining method hereinafter described may be used to join the edges of the sheets along all three sides 10, 11, and 12 of the envelope, for which type of manufacture the machine illustrated in Figs. 6 and 7 is designed, or the envelope may be formed by first folding the sheet material along the edge 12 and then cutting and joining the material along the edges 10 and 11, as is accomplished by the machine shown in Figs. 3 and 4.

One embodiment of our envelope or bag making machine is shown in Figs. 3 and 4 as having a suitable frame 14 with a spindle 15 thereon for supporting a roll 16 of sheet material in strip form. The strip 17 which is led or drawn from the roll 16 passes over a triangular creasing or folding plate 18 and then between rollers 19, 19 to produce a folded strip. This folded strip then passes between tension rollers 20, 20 which are pressed together by suitable means and one or both of which may be driven by power means 21 to feed the strip to cooperating rotating cutting and sealing elements 22 and 23. Element 22 is sharpened or beveled along one edge 24, see Fig. 5, and is heated, as by the electric element 25 incorporated therein, or by other means. Element 23, which forms an anvil for knife element 22, may or may not be heated. Elements 22 and 23 rotate on spindles 27 and 28 respectively and are driven from the power means 21 in timed relation to the feed rolls 20.

The cooperating knife and anvil elements 22 and 23 pinch the strip 17 at each revolution, and, in so doing, the heat of the element 22 or of the elements 22 and 23, as the case may be, softens the sheet material along the line of knife contact and the pressure causes the softened material to be cut or partially cut transversely of the strip and also causes the adjacent cut edges of the top and bottom sheets to be fused or sealed together.

A pair of pressure rollers 29 and 30 are arranged to receive the strip 17 from the knife and anvil elements and may be driven from the power means 21 to rotate slightly faster than the feed rollers 20, 20 so as to provide a light tension on the strip. The tensioning of the strip at this point separates the individual envelopes from the strip immediately after the pinching and sealing thereof by the elements 22 and 23. The finished envelopes are delivered from the rollers 29 and 30 to a conveyor 31 which carries them to a bin 32.

In the machine illustrated in Figs. 6 and 7, two strips 35, 35 are unwound from rolls 36, 36 of suitable sheet material and are advanced in superimposed relation by feed rollers 37, 37 to a first pair of cooperating rotating cutting and sealing elements 38 and 39. At this point the strips are cut longitudinally and the cut edges are joined or sealed in a manner similar in principle to that described above. These cooperating elements 38 and 39 are shown in section and on a larger scale in Fig. 8 from which it will be seen that the element 38 has a beveled annular edge 38a and an electric heating element 38b embodied therein adjacent such edge. The longitudinally cut and joined strips then pass between cooperating rotating cutting and sealing elements 40 and 41, which are identical with those shown in Figs. 3 to 5, and are cut transversely into individual envelopes or bags which are delivered by tension rollers 42 and 43 to the conveyor 44 and then to the bin 45.

In Figs. 9, 10, and 11 we have shown another form of our envelope or bag making machine which is also adapted to carry out our novel method. This machine is provided with a frame 50 which supports a roll 51 of suitable sheet material from which is unrolled a strip 52. By means of a folding device consisting of cooperating rollers 53 and 54, the strip is folded along its longitudinal center line. The folded or doubled strip passes around the lower half of the roller 54 and then around the outer surface of a cylinder 55 upon which the severing and joining operations take place.

This cylinder is rotatably mounted on the frame 50, as by means of shafts 56 and 57, and may be driven by suitable power means 56a connected with the shaft 56 to draw the strip of material from the roll 51. The cylinder 55 is hollow and is preferably formed of material which is not a conductor of electricity, such as hard rubber. At circumferentially spaced points around its outer surface, we provide the cylinder with electrical conducting wires 58 which extend parallel with the axis of cylinder rotation and, at their ends, are connected with commutator segments 59 mounted on the end walls of the cylinder. Brushes 60 mounted on, but insulated from, the frame adjacent the ends of the cylinder cooperate with the segments of the commutators so that an electric current supplied to the brushes by conductors 61 can be made to pass through each wire 58 when it reaches a certain point of cylinder rotation. The wires 58 are formed of resistance wire, so that they will be heated by the electric current flowing therethrough, and may be connected with the commutator segments by means of spring arms 62 which project radially from the segments and keep the wires under tension.

As the strip is laid upon the cylinder by the roller 54, it overlies the wires 58 and, since the strip is under tension, it presses and holds the wires against the outer surface of the drum during rotation thereof. To hold the strip in frictional contact with the cylinder, we provide an endless chain 63 which wraps partially around the cylinder on top of the strip. This chain has pairs of bars 64 which are slightly longer than the cylinder 55 and extend substantially parallel with the axis thereof. These bars are joined together at their ends by U-shaped members 65 which form short links of the chain. Longer links 66 have their ends pivotally connected with the bars 64 adjacent the U-shaped members 65. The ends of the cylinder are provided with projecting pins 67 which engage in notches 68 of the longer links for causing the chain to be driven by the drum. Idler members 69, which may be suitable sprockets or rollers, are rotatably mounted on the frame and cause the chain to wrap a portion of the drum.

The chain 63 is constructed so that the spacing of the pairs of bars 64 will correspond with the spacing of the wires 58 and, as the cylinder rotates, the chain will overlie the strip and the bars of each pair will press the material against the drum on opposite sides of one of the wires, as shown in Fig. 12. When each wire reaches the point where its commutator segments 59 contact the brushes 60, an electric current will flow through the wire and heat the same. The heated wire softens the material of the strip pressed thereagainst and causes the material to become tacky. The tension produced in the wire by the spring arms 62 of its commutator segments causes the wire to cut or break through the softened material of the strip, as illustrated in Figs. 13 and 14, thus cutting or severing the strip transversely at points corresponding with the edges of the envelopes or bags being produced. As the wire softens the material of the strip and cuts or breaks through the same, it causes the material to be locally fused or joined so that the cut edges become sealed or joined together.

It is desirable to prevent the cut ends from dropping back into contact with each other after the wire has broken through the strip, so as to avoid having the ends stick together while the material is yet soft and tacky. For this purpose, we provide the drum with a row of openings 71 under each wire and through which a blast of air may be forced radially outwardly to hold the cut and sealed edges of the strip away from the surface of the drum, as indicated in Fig. 14. This blast of air also serves to cool the fused and sealed edges of the strip while the cylinder is rotating to the point where the bags or envelopes will be discharged into the receptacle 72. Air pressure for producing the blast may be introduced into the cylinder through an opening provided in the shaft 57. At a further point of rotation of the cylinder, the chain separates from the cylinder surface and releases the envelopes or bags which have been formed from the strip. As the articles are released, the forward motion of the drum and chain causes them to drop into the bin 72. If desired, an air blast may also be discharged through additional openings 73 to loosen the articles from the drum surface when they have been released by the chain.

While we have illustrated and described the method and apparatus of our invention in a somewhat detailed manner, it should be understood that we do not wish to be limited to the precise forms of apparatus and steps of procedure herein disclosed but regard our invention as including such changes and modifications as do not constitute a departure from the spirit of the invention and the scope of the appended claims.

Having thus described our invention, we claim:

1. The method of making bags or the like from thin thermoplastic sheet material which comprises providing a strip having superimposed layers of the material, advancing the strip over a rotating drum having electric heating elements extending transversely of the strip, pressing the strip against the drum and elements to cause softening and severing of the strip transversely thereof along the lines of contact with the element and sealing of the adjacent edges of the severed ends.

2. The method of making bags or the like from thin thermoplastic sheet material which comprises providing a strip having superimposed layers of the material, advancing the strip over a rotating drum having electric heating elements extending transversely of the strip, pressing the strip against the drum and elements to cause softening and severing of the strip transversely thereof along the lines of contact with the element and sealing of the adjacent edges of the severed ends, and blowing air against the severed ends to keep them separated after severance and to cool and harden the sealed edges.

3. The method of making bags or the like from thin thermoplastic sheet material which comprises providing a strip having superimposed layers of the material, advancing the strip over a rotating drum having electric heating elements extending transversely of the strip, pressing the strip against the drum and elements to cause softening and severing of the strip transversely thereof along the lines of contact with the element and sealing of the adjacent edges of the severed ends, releasing the pressure on the articles thus produced, and discharging a blast of air against the articles to dislodge them from the drum.

4. In apparatus of the character described, means for advancing thermoplastic sheet material in the form of a strip having superimposed layers, and means comprising a pair of members cooperating with each other for applying heat and pressure to the strip along lines traversing the same to thereby sever the strip and seal the adjacent severed edges, one of said members being an electrically heated wire arranged for direct contact with one side of the strip.

5. In apparatus of the character described, an elongated heating and severing element, means yieldably supporting said element, means for pressing thermoplastic sheet material against said element and thereby tensioning the sheet material, and means for electrically heating said element.

6. In apparatus of the character described, a supporting surface, an elongated heating element comprising a tensioned wire spaced above said surface, means for pressing a plurality of thicknesses of sheet material on said surface in overlying relation to said wire and in direct contact therewith, and means for electrically heating said wire.

7. In apparatus of the character described, a rotatable cylinder, an elongated heating element spaced from the outer surface of the cylinder and extending longitudinally with relation to the axis of the cylinder, means for laying a plurality of thicknesses of sheet material on said cylinder and over said heating element, and means for electrically heating said element.

8. In apparatus of the character described, the combination of a rotatable cylinder, a plurality of elongated heating elements spaced circumferentially around the surface of the cylinder and extending in the direction of the cylinder axis, and a flexible traveling member disposed to engage the surface of the cylinder and to press sheet material against the cylinder and the heating elements.

9. In apparatus of the character described, the combination of a rotatable cylinder, a plurality of elongated heating elements spaced circumferentially around the surface of the cylinder and extending in the direction of the cylinder axis, a flexible traveling member disposed to engage the surface of the cylinder and to press sheet material against the cylinder and the heating elements, said cylinder having openings therein adjacent said elements, and means for discharging air through said openings.

10. In apparatus of the character described, a support having a heating element extending thereabove, means for placing layered thermoplastic sheet material on said support in overlying relation to said element, and pressure means adapted to engage the sheet material on opposite sides of the element for pressing the material against the element and support.

11. In apparatus of the character described, a support having a heating element extending thereabove, means for placing layered thermoplastic sheet material on said support in overlying relation to said element, pressure means adapted to engage the sheet material on opposite sides of the element for pressing the material against the element and support, means for heating said element to cause the same to fuse and sever the material, and means for discharging air against the severed ends to separate and cool the same.

12. The method of operating on thin sheet material which comprises advancing the sheet material over a hollow rotary member having spaced severing elements, pressing the material against said elements to cause severance thereof into sections, and creating a fluid pressure differential between opposite sides of the severed sections to dislodge the same.

13. In apparatus for operating on thin sheet material, a rotatable drum having peripheral openings and spaced severing elements, means for advancing the sheet material over the drum and pressing the same against said severing elements whereby the material is severed into sections, and means for creating a fluid pressure differential on opposite sides of the sections for dislodging the same from the drum.

14. In apparatus for operating on thin thermoplastic sheet material, a wire, means for passing electricity through the wire for heating the same, and means for causing the material to be pressed into direct contact with the wire to be heated thereby along a line corresponding with the engagement of the wire therewith.

15. In apparatus for operating on thin thermoplastic sheet material, a wire, means for supporting the wire under tension, means for electrically heating the wire, and means for causing the material to be pressed into direct contact with the tensioned wire to be heated thereby along a line corresponding with the engagement of the wire therewith.

16. The method of operating on thin thermoplastic sheet material which comprises tensioning the material and causing a heated severing element to be pressed against the tensioned material and thereby softening and severing the material along the line of contact of said element therewith.

17. The method of operating on thin thermoplastic sheet material which comprises providing superimposed layers of such material, tensioning the material and causing a heated severing element to be pressed against the tensioned material and thereby softening and severing the material along the line of contact of said element therewith and causing sealing of the adjacent severed edges.

RALPH L. PENN.
RALPH W. PENN.
NORMAN H. NYE.